Aug. 8, 1939.　　A. H. AHRNDT　　2,168,612
SLICING MACHINE
Filed May 3, 1935　　8 Sheets-Sheet 1

Inventor:
Arthur H. Ahrndt
By:- Cox & Moore attys.

Aug. 8, 1939.    A. H. AHRNDT    2,168,612
SLICING MACHINE
Filed May 3, 1935    8 Sheets-Sheet 4

Inventor:-
Arthur H Ahrndt
By: Cox & Moore attys

Aug. 8, 1939.　　　A. H. AHRNDT　　　2,168,612
SLICING MACHINE
Filed May 3, 1935　　　8 Sheets-Sheet 5

Inventor:
Arthur H. Ahrndt
By: Cox & Moore attys

Aug. 8, 1939.    A. H. AHRNDT    2,168,612
SLICING MACHINE
Filed May 3, 1935    8 Sheets-Sheet 8

Inventor:
Arthur H. Ahrndt
By:- Cox + Moore attys

Patented Aug. 8, 1939

2,168,612

UNITED STATES PATENT OFFICE 2,168,612

SLICING MACHINE

Arthur H. Ahrndt, La Porte, Ind., assignor to U. S. Slicing Machine Company, La Porte, Ind., a corporation of Indiana Application May 3, 1935, Serial No. 19,649

9 Claims. (Cl. 146—101)

This invention relates to slicing machines, and particularly to slicing machines for slicing foodstuffs. More particularly, the invention relates to a slicing machine for slicing bread.

An important object of the present invention is to provide a new and novel slicing machine having a rotatably mounted knife which also moves in a circle or orbit to effectively and cleanly sever slices from a piece of material such as bread.

Another important object of the invention is to provide a slicing machine which has new and improved means for feeding the foodstuffs to cutting position, which is provided with a slice receiving trough for receiving the slices, there being means provided in connection with the trough for facilitating the quick and easy removal of the slices from the trough.

A further object of the invention is to provide a slicing machine which has new and novel means for determining or governing the thickness of the slice to be cut, which is provided with new and improved means for feeding the substance to cutting position, which is provided with novel means for adjusting and regulating the feeding and cutting movement, and which is provided with a substance or loaf engaging element which is automatically thrown out of normal holding position when the substance or loaf reaches a predetermined position with respect to the cutting knife.

Other important objects of the invention relate to the particular construction and arrangement of the parts, the novel combinations whereby the parts are most effectively controlled and operated, and the particular shape, construction and contour of the various elements which constitute the more important features of the invention.

Numerous other objects and advantages will be apparent throughout the progress of the following specification.

The accompanying drawings illustrate a selected embodiment of the invention and the views therein are as follows.

The particular slicing machine herein shown for the purpose of illustration comprises a base or bottom support 1 upon which the machine is supported. A motor 2 is operatively mounted on the support and has a driving pulley 3, Fig. 2, which drives a belt 4, the belt driving a counter shaft pulley 5 which is mounted on an adjustable shaft 6. A reduction pulley 7 is mounted on the shaft 6 and drives a belt 8 which passes over and drives the pulley 9. Each of the pulleys are preferably provided with a V-shaped groove as indicated but, of course, other pulleys and driving mechanism may be substituted for the particular structure shown.

Figure 3:
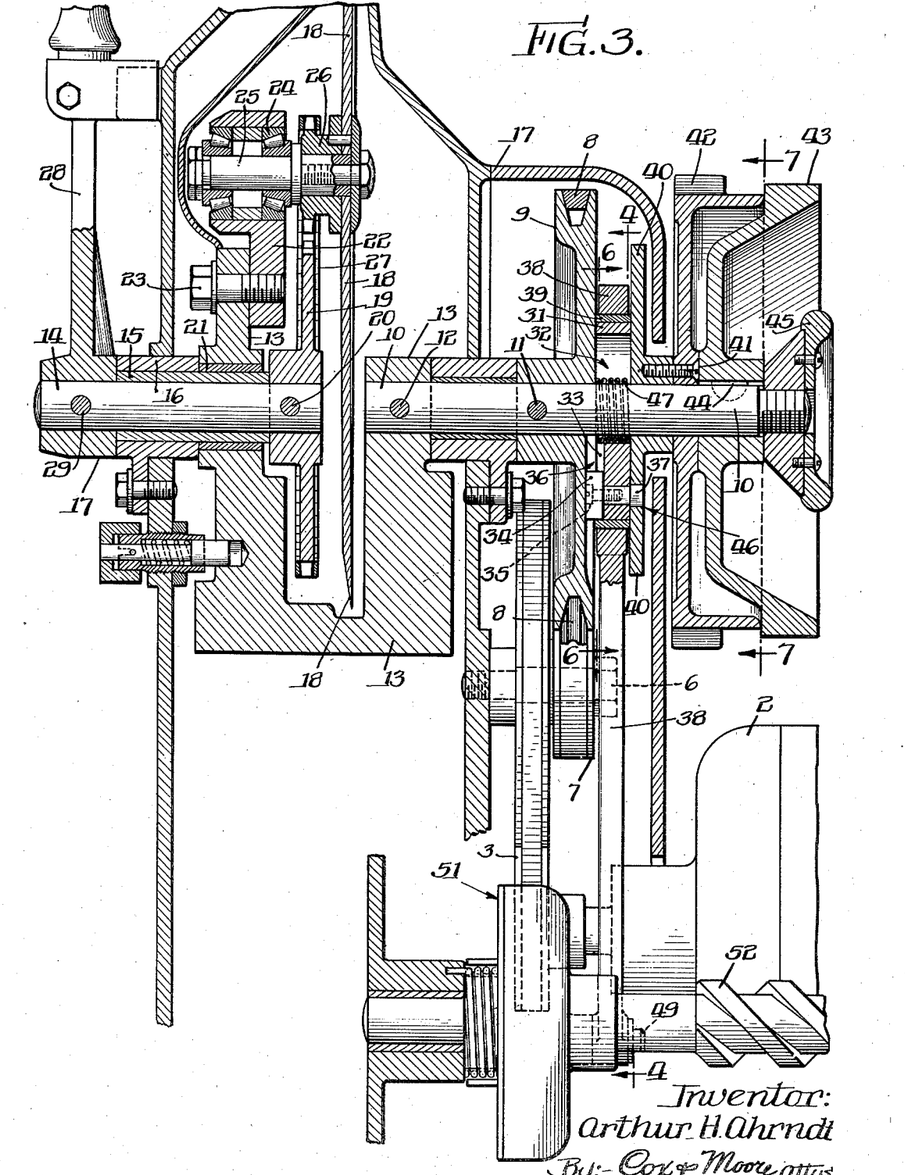
Fig. 3 is a detail vertical sectional view on the line 3—3 of Fig. 2.

The pulley 9 is fixed to a shaft 10, as indicated at 11, Fig. 3, and is properly supported in the housing. The shaft 10 carries a pin 12 which rigidly secures the knife carrying bracket 13, Fig. 3. A second shaft 14 is mounted in the housing and in a direct line with the shaft 10. This second shaft 14 is journaled in a bushing 15 which is securely fastened to a bracket 16 connected to the slicing machine housing 17. The knife carrying bracket 13, Fig. 3, is substantially U-shaped and partly encloses the slicing machine knife 18 and the knife driving sprocket 19. The sprocket 19 is fixed to the shaft 14 by a fastening pin 20. One side of the U-shaped knife supporting bracket 13 is secured to a bushing 21. The bushing, with the knife supporting bracket and its mechanism, is therefore free to revolve around the bushing 15 when the shaft 10 is revolved by the pulley 9. A bracket 22, Fig. 3, is secured by bolts 23 to a part of the knife carrying bracket 13. Anti-friction bearings 24, carried by the bracket 22, revolubly support a shaft 25. The shaft 25 is freely mounted in the bearing 24 and has a sprocket 26 fixed thereto to which a slicing knife 18 is rigidly fastened. A sprocket chain 27 passes around the sprocket 19 and the sprocket 26 and drives the sprocket 26 to cause rotation of the slicing knife 18. A crank 28 is fixed to the shaft 14 by means of a pin 29, the crank being fastened by a suitable lock 30 to the housing 17. Locking of the rigidly mounted crank maintains the shaft 14 and the sprocket 19 stationary, and the knife supporting bracket 13 and the knife mounting are revolved by the driving pulley 9. The general principle of the knife driving mechanism is disclosed in Mahler Patent No. 1,976,823, Thomas Patent No. 1,960,930, and Stukart Patent No. 1,884,912, assigned to the present assignee.

Figures 4, 5, 6, 7:
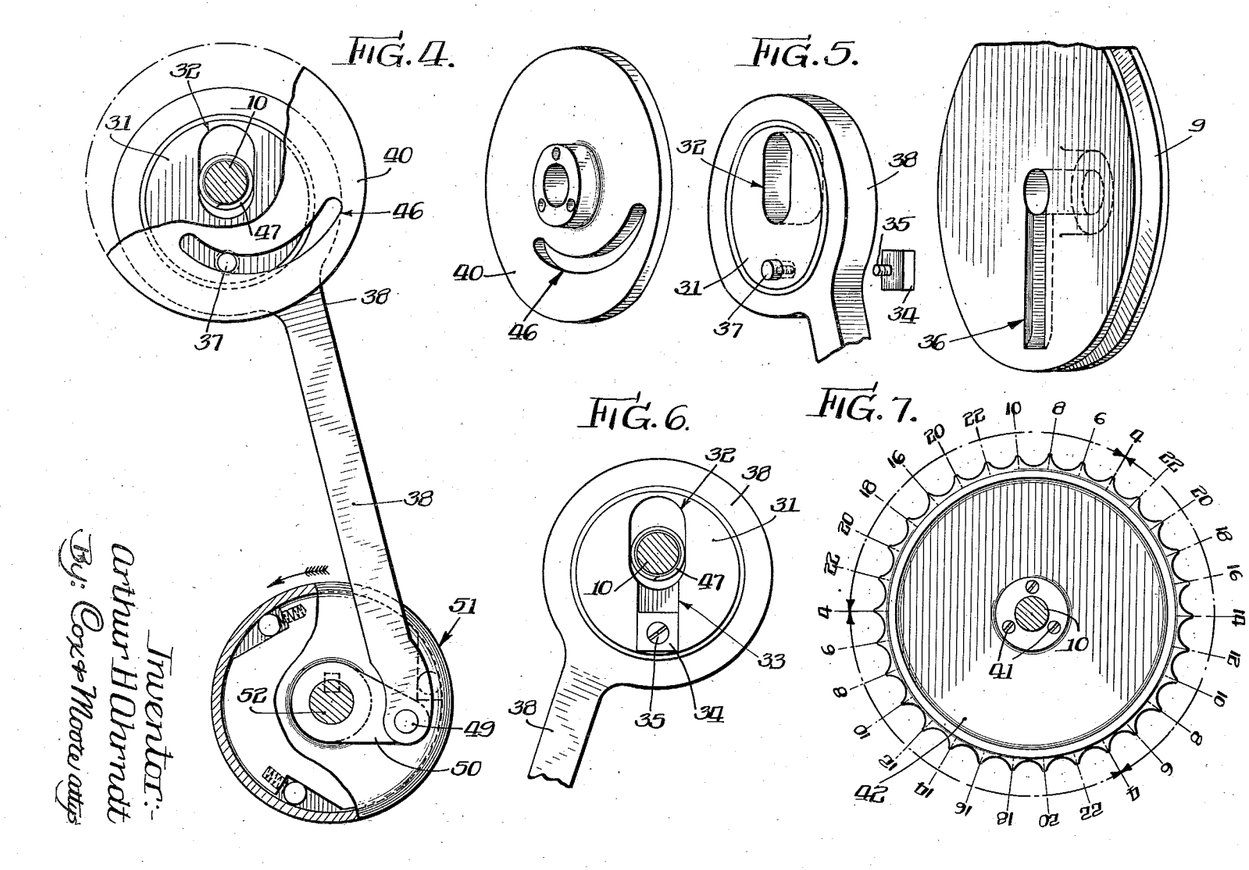
Fig. 4 is a detail sectional view on the line 4—4 of Fig. 3 and shows the feed driving mechanism.
Fig. 5 is a detail perspective view showing the various elements or parts forming the mechanism shown in Fig. 4.
Fig. 6 is a detail elevational view, partly in section, on the line 6—6 of Fig. 3 showing an opposite side of one of the elements shown in Figs. 4 and 5.
Fig. 7 is a detail sectional view on the line 7—7 of Fig. 3 and showing the dial indicating means for regulating the thickness of slices to be cut.

The feed driving mechanism, Fig. 3, is mounted on the shaft 10 immediately adjacent the driving pulley 9, being shown to the right of the pulley 9 in Fig. 3. Immediately to the right of the web of pulley 9, Fig. 3, an eccentric 31 is mounted on the shaft 10, and this eccentric has a vertical slot 32, Figs. 3 and 5. A key slot 33, Fig. 6, is also formed in the eccentric 31 and this key slot is in line with the slot 32. A key 34 is fastened by screws 35 in the slot 33 and is arranged to slide in a corresponding slot 36 provided in the pulley 9, Figs. 3 and 5. A pin 37 is fastened in any convenient manner, such as by pressing, in the eccentric 31. A strap or connecting or driving rod 38 is hung over the outside of the eccentric 31 and is provided with a bushing 39. A disc 40 is fastened by screws 41 to an index wheel 42, both the disc and the index wheel being loosely mounted on the shaft 10, Figs. 3 and 5 to 7. A knurled hand wheel 43 is keyed to the shaft 10 by a key 44, Fig. 3, and a knob 45 is threaded to the shaft 10, as clearly shown in Fig. 3. The disc 40, Figs. 3 and 5, is provided with an arcuate slot 46 which is adapted to receive the pin 37. The disc 40 can be rotated together with the index wheel 42 around the shaft 10 so that the slot 46 will move in relation to the pin 37. Such movement displaces the eccentric 31 in the direction of the slot 32 and the key 34, so that it changes the eccentricity of the eccentric 31. A compression spring 47, Fig. 3, is placed between the pulley 9 and the disc 40 so that when the knob 45 is loosened on the thread the spring 47 will urge the disc 40 along with the index disc 42 and the knurled hand wheel 43 to cause a slight clearance between the side of the eccentric 31 and the pulley 9 and the discs, respectively. Therefore, the eccentric 31 can be moved freely in the direction of the axis of the slot 32. The width of the eccentric strap rod 38 is slightly less than the width of the eccentric 31 so that the strap 38 will not be pinched between the disc 40 and the pulley 9 during rotation of the shaft 10. The eccentric strap 38 follows only the eccentric movement, thereby causing an up and down or pumping operation to rotate certain mechanism later to be described. While the knurled wheel 43 may have a slight sliding movement to respond to the action of the spring 47, it can not revolve in relation to the shaft 10, and, therefore, to set the index wheel 42 the knurled knob 43 is held stationary while the scalloped circumference of the index wheel 42, with its index numbers, is passed by the arrow 48 for setting a suitable slice thickness indicated by the index number. The knob 45 is then securely tightened so that all the parts mounted on the shaft 10, with the exception of the eccentric strap 38, will revolve as a unit.

The eccentric strap rod 38 is fastened by a pin 49, Figs. 3 and 4, to an arm 50 of a so-called free wheel mechanism, indicated generally by the numeral 51, to revolve a feed screw 52 in one continuous direction. The movement of the strap rod 38 causes driving action of the feed screw in one direction during movement in one direction of the strap 38, the return movement of the strap having no effect on the feed screw, merely idling thereover on the return direction. The free wheel driving mechanism 51 is of any conventional type and may include a ball and clutch mechanism, as clearly shown in Fig. 4, or it may be any other conventional mechanism, such as ratchet metchanism. The free wheeling device 51 includes a feed screw brake, Fig. 3, which prevents retrograde movement of the feed screw on the idle return stroke of the feed eccentric strap rod.

Figure 2:
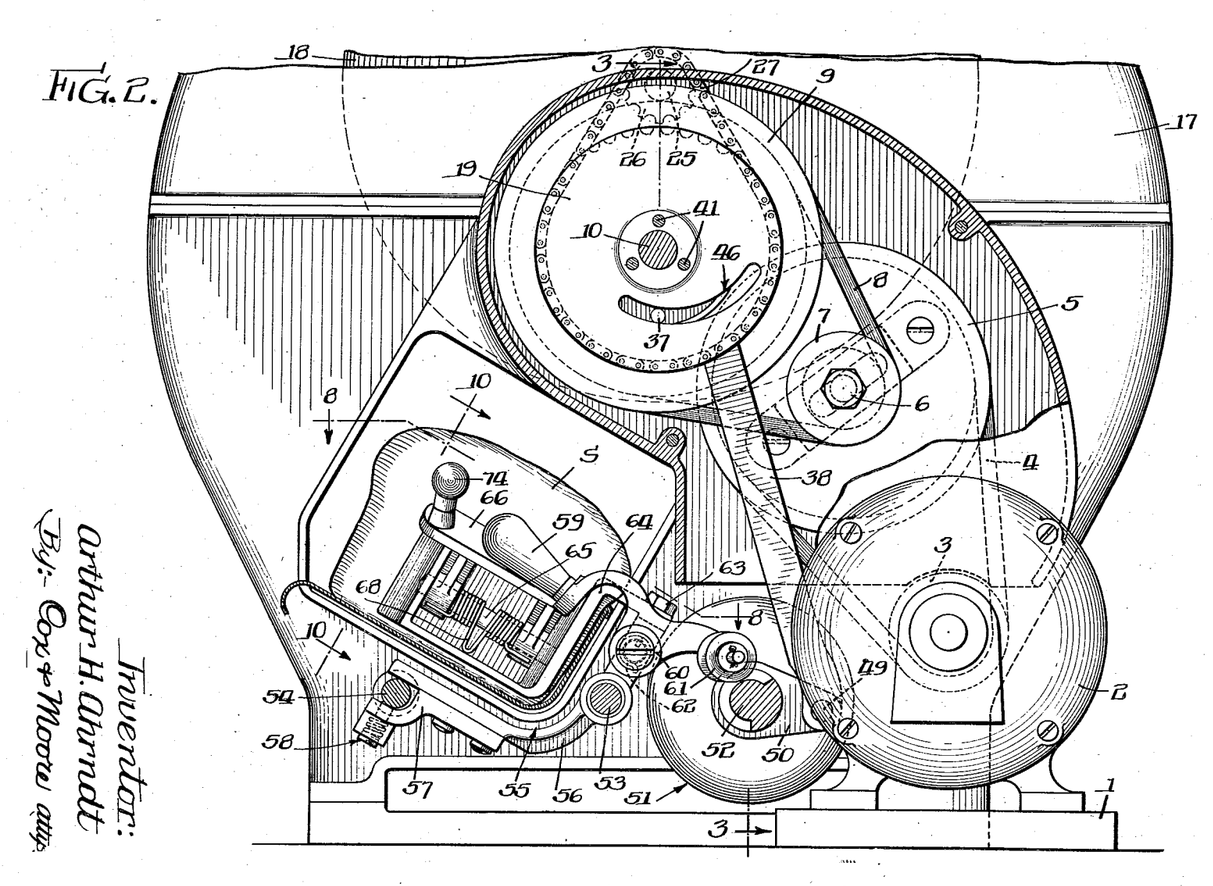
Fig. 2 is a detail vertical transverse sectional view on the line 2—2 of Fig. 1.
Figures 8, 9:
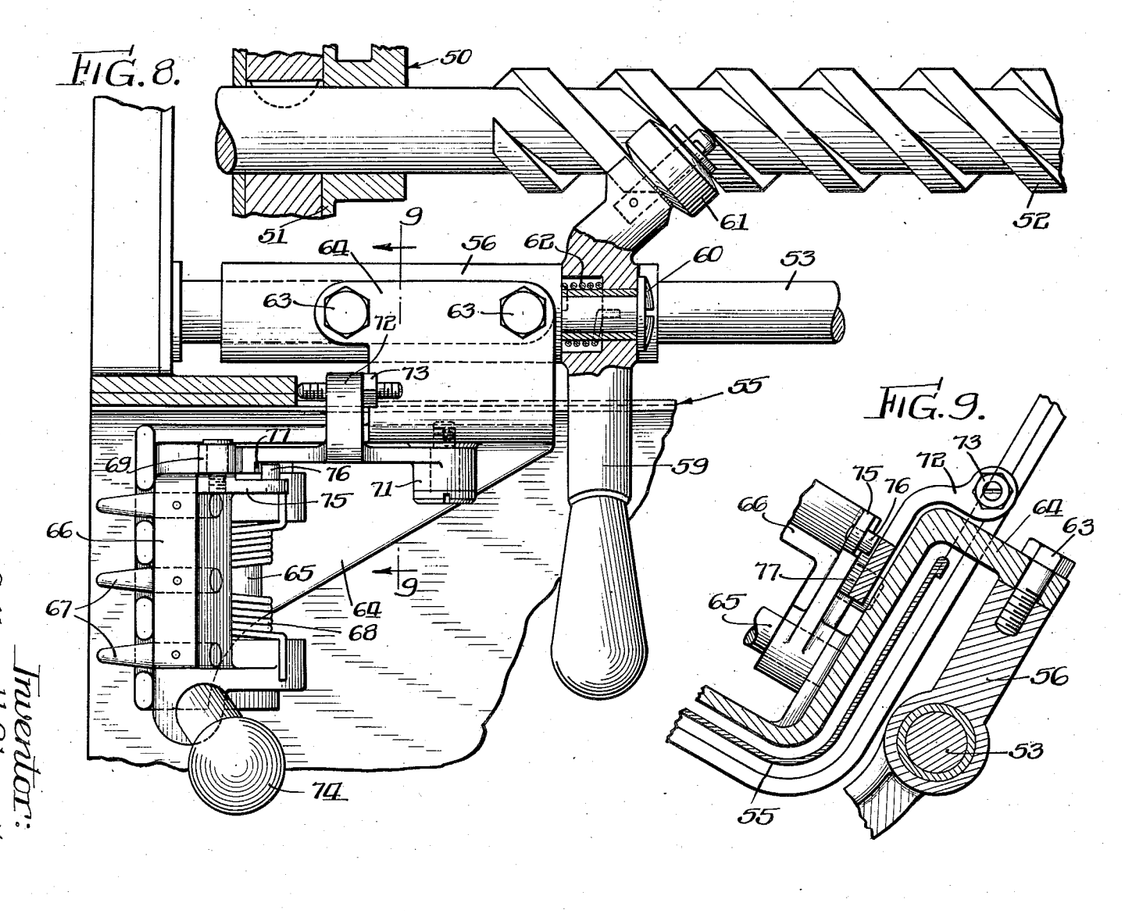
Fig. 8 is a detail plan section on the line 8—8 of Fig. 2.
Fig. 9 is a detail transverse sectional view on the line 9—9 of Fig. 8.
Figure 11:
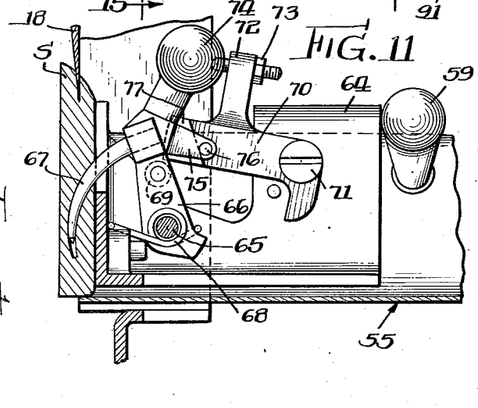
Fig. 11 is a detail elevational view, partly in section, showing the pronged substance engager for feeding the substance to slicing position, the view showing the prongs in engagement with the substance.
Figure 12:
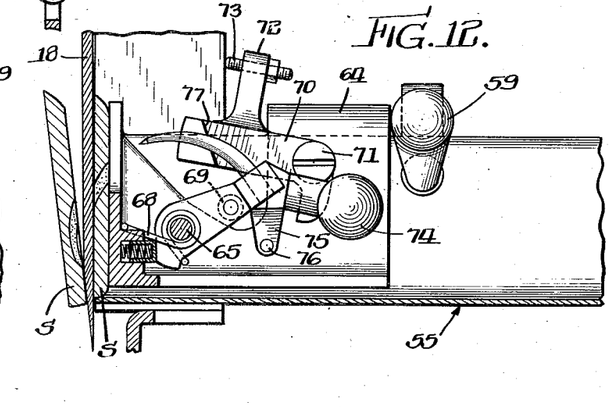
Fig. 12 is a view similar to Fig. 11 but showing the parts in retracted position.

The feeding mechanism comprises the feed screw 52 and parallel guide rods 53 and 54, Fig. 2, which run parallel with the feeding trough 55. A feeder sleeve 56 is guided on the rod 53 and a guide arm 57 attached to the sleeve 56 is guided on the rod 54. The guide arm 57 is provided with a spring pressed plug mechanism 58 for frictional contact with the rod 54, as clearly shown in Fig. 2. A lever arm 59, Fig. 8, is fastened by a pin 60 to the sliding sleeve 56, and this lever 59 carries a roller 61 which acts as a feed nut, being guided in the convolutions between the threads on the feed screw 52. The side of the roller 61 engages the feed screw thread to reduce friction. A torsion spring 62, Fig. 8, is arranged between the pin 60 and the lever 59 and causes a light or gentle contact pressure between the nut roller 61 and the feed screw 52. The feeding movement of the screw is in a counter-clockwise direction, as shown by the directional arrow in Fig. 4. The roller 61, Fig. 8, is so positioned with respect to the center of the feed screw 52 and the pivot pin 60 that a slight drawing effect is created between the roller 61 and the feed screw 52 providing a tendency to urge the nut roller 61 toward the feed screw to insure proper engagement. The sleeve 56 is secured in any convenient manner, such as by a screw 63, to a feeder bracket 64, Figs. 2 and 8. A shaft 65 is carried by the feeder bracket 64, Figs. 9 to 12, and a needle bracket 66 having impaling needles 67 for gripping the substance, is pivotally mounted on the shaft 65. A torsion spring 68, Figs. 8, 10, 11 and 12, is fastened between the stationary pin or shaft 65 and the pivoted needle bracket 66 and urges the bracket 66 in a clockwise or retracted direction. The bracket 66 is provided with a roller 69, Fig. 8, which engages a latch 70 pivoted at 71, Figs. 10 to 12. When the bracket 66 with the needles 67 has been moved in a counter-clockwise direction to engage the substance S, the latch 70 is placed in engagement with the roller 69. The latch 70 has a vertical arm 72 which is provided with an adjusting screw 73. When the substance S has been sliced and the feeder bracket 64 has arrived at the cutting edge of the knife 18, Fig. 11, the adjusting screw 73 will engage a part of the stationary housing 17, and even though the feed screw continues to move the feeder bracket in the direction of the knife cutting edge, the engagement of the latch 70 with the roller 69 will become disengaged so that the gripper bracket will be swung on its pivot 65 with a snap action because of the spring 68. While the feeding movement is comparatively slow as compared to the snap action of the disengaging gripper, the gripper needles will have ample time to clear the rotating knife before the face of the gripper bracket is moved in an approximate line with the cutting edge of the knife. The contact of the adjusting screw 73 with the stationary housing is so timed that the gripper needles 67 will move or already be moved to disengaging position as shown in Fig. 12, before the gripper bracket makes its final forward feeding movement. The final forward feeding movement pushes the grip end of the substance, that is the last slice, from the feeding trough to the slice receiving trough.

Figure 1:
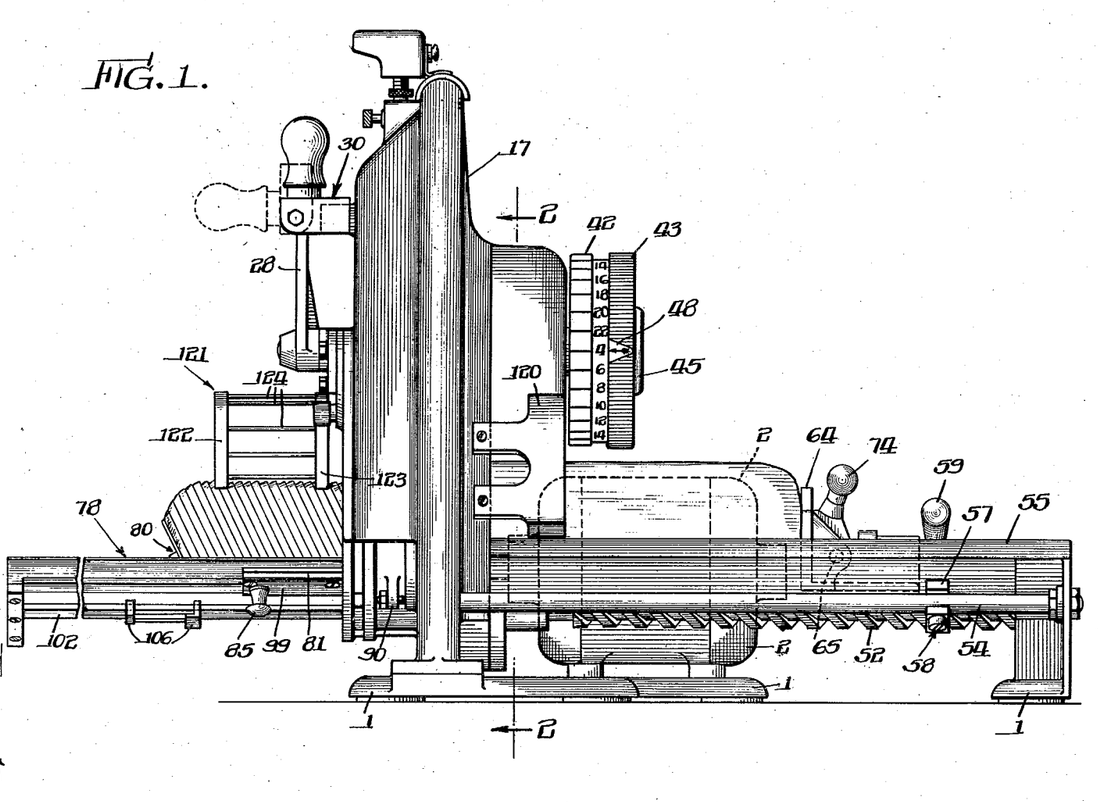
Fig. 1 is a detail longitudinal front elevation of the improved slicing machine and embodies the invention.

The feeding trough 55, as well as the slice receiving trough, is inclined in relation to the horizontal. This inclination has a tendency to urge the loaf to be cut and the slices already cut into the bottom of the V formed by the inclined side walls of the trough. The knife 18 moves bodily in a clockwise direction and at the same time rotates around its own axis in a counter-clockwise direction in the manner previously described, and as described in the aforesaid patents. The counter-clockwise movement of the knife about its own axis is much faster than the bodily movement of the knife about the orbit; thereby the urging of the substance in one direction is decidedly stronger than the urging action in the opposite direction. The gripper bracket is provided with an operating handle 74 whereby the gripper bracket can be moved to gripping position, as clearly shown in Fig. 10. In this figure the gripper teeth or prongs 67 are embedded in the end of a loaf of substance S. In Fig. 11 the teeth or prongs 67 are in alinement with the knife but are so timed that they will be retracted from engaging position before the knife can strike them. In Fig. 11 the bracket is shown tripped ready to be returned by the spring 68 to retracted position, shown in Fig. 12. To further insure the positive retraction of the gripper prongs from the substance, and the gripper bracket to retracted position, as shown in Fig. 12, and to prevent the prongs 67 from sticking into the substance S, additional and positive partial retracting means are provided. This latter means comprises a lever 75, Figs. 8 to 12, having an outstanding pin 76 which is rigidly fastened to the bracket 66 and which is adapted to engage a cam 77 formed on the end of the latch 70. Therefore, when the gripper bracket 66 reaches the end of its feeding travel, as shown in Fig. 11, the latch 70 will be swung on its pivot 71, raising the forward end of the latch 70, when the cam 77 will engage the pin 76 and free the prongs 67 from the substance, as shown in Figs. 11. As soon as the prongs are released or freed from the substance the spring 68 will urge the bracket to its retracted position with a quick snap, to the position shown in Fig. 12. At the end of the forward travel of the bracket 66 when the set screw 73 engages the stationary part of the housing 17, the latch 70 will be swung on its pivot raising the forward end thereof, and as soon as the latch has been raised due to this contact, then the cam 77 will engage the pin 76 to loosen the prongs and permit the spring to return the bracket and the rigid gripper teeth to retracted position, as shown in Fig. 12. Therefore, the set screw 73, when in engagement with the housing, will prevent forward movement of the bracket while the pin 76 and cam 77 cause the prongs to be loosened in the substance so that they will be free, permitting the spring to retract the prongs before the knife 18 can possibly come into striking engagement with the prongs. As shown in the drawings, particularly as shown in Fig. 1, the feeding trough with the gripper connection is on the right hand side of the machine, while the slice receiving trough with the slices and the slice removing bracket is on the left hand side of the machine.

Figure 10:
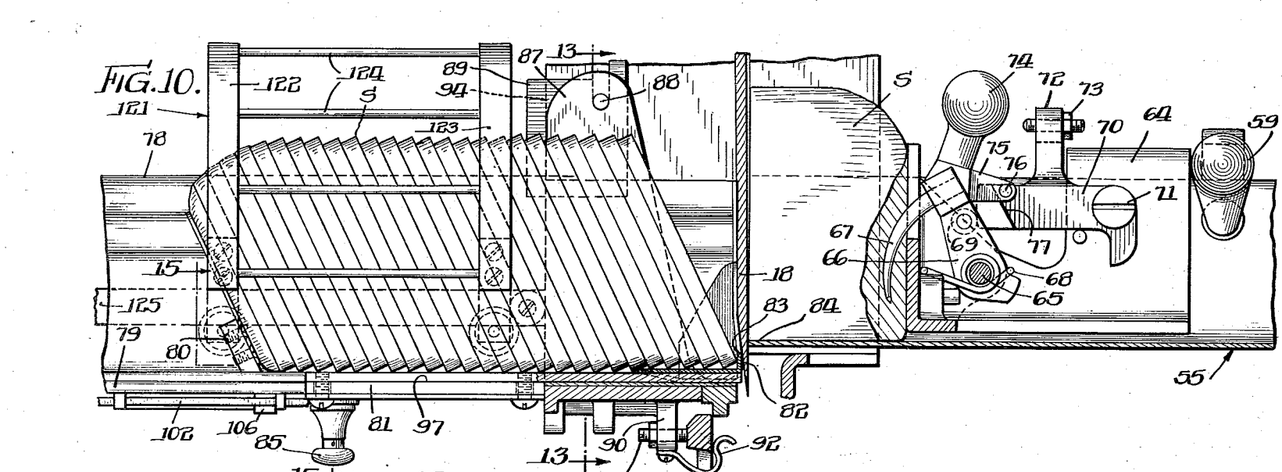
Fig. 10 is a longitudinal sectional view through the feeding and receiving troughs taken on the line 10—10 of Fig. 13.
Figure 13:
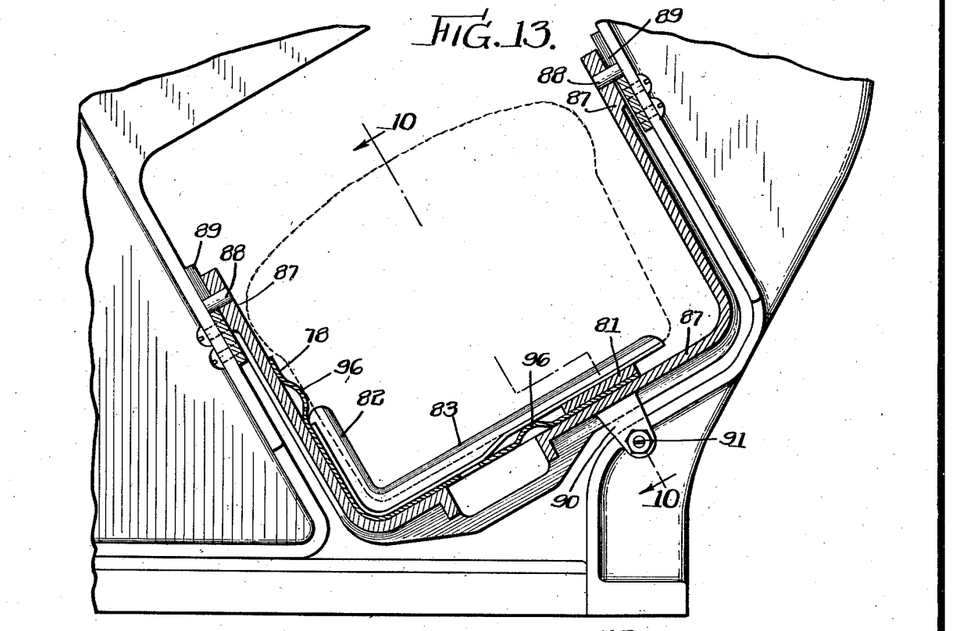
Fig. 13 is a transverse sectional view on the line 13—13 of Fig. 10.

A slice pan 78, Fig. 10, is provided with a stiffening and guiding rail 79 and a slice abutment 80 which is similar to that shown in application Serial No. 622,523 by Morris Brustowsky, assigned to the present assignee. A slide bearing or bracket 81, Figs. 10 and 15 to 18, is slidingly mounted on the guide 79. A small flange 82 is fastened to the slide bearing 81 and is L-shaped, as clearly shown in Fig. 10, being adjusted very close to the knife while cutting of slices takes place. The upper edge 83 of the L-shaped flange 82 is slightly below the feeding trough surface 84, Fig. 10, so that the cut slices will have to step over or drop over the edge 83 onto the slice trough. The edge 83 of the flange 82 is continued toward the back of the slice trough, projecting from the back side of the trough toward the operator as much as the edge 83 projected from the surface 82 in a vertical direction, as clearly shown in Fig. 13. The flange 82 therefore forms a border frame behind which the cut slices have been stepped, as clearly shown in Fig. 10. A knob 85, Figs. 10, 14 and 15, having a spring pressed plunger 86, Fig. 15, is fastened to the bracket 81. When this knob is pulled out and then pulled toward the left, the flange 82 being behind the last slice cut will cause the whole sliced loaf to be pulled toward the left, Figs. 1 and 10. This arrangement, therefore, permits the entire cut loaf to be moved along the trough at one time and carried to wrapping position, avoiding the necessity of the operator reaching into the vicinity of the knife to remove the last slices. The end of the plunger 86 of the guide knob 85 fits into a suitable recess to lock the slide bearing 81 into the position shown in Fig. 15. The slice trough 78 is fastened to a suitable bracket 87 which is pivoted by a pin 88 to a suitable side bracket 89, Fig. 10. At the bottom of the trough bracket 87 a lug 90, Fig. 10, is provided, there being a set screw 91 threaded into the lug 90 and adapted for engagement with a rigid part of the structure for adjusting the end 83 with respect to the knife, Fig. 10. A holding element 92, which may comprise a flexible spring, may be provided to hold the parts in adjusted position. The weight of the trough causes the adjusting screw 91 to abut against the rigid part of the frame, as shown in Fig. 10, so that the adjustment screw will keep the edge of the trough a suitable distance from the cutting plane of the knife.

Figure 14:
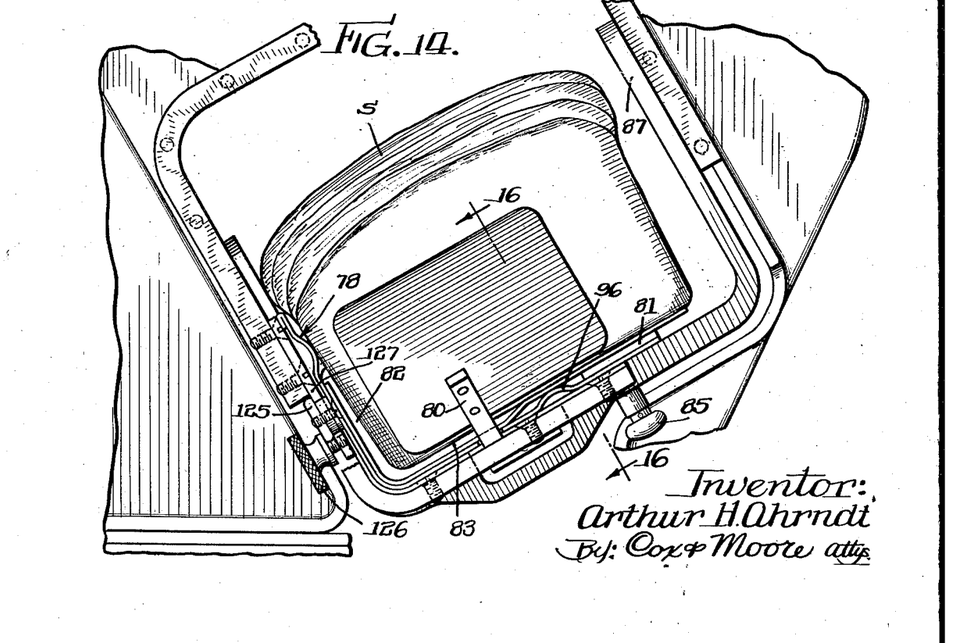
Fig. 14 is an end view of the slice receiving tray.
Figures 15, 16, 17, 18:
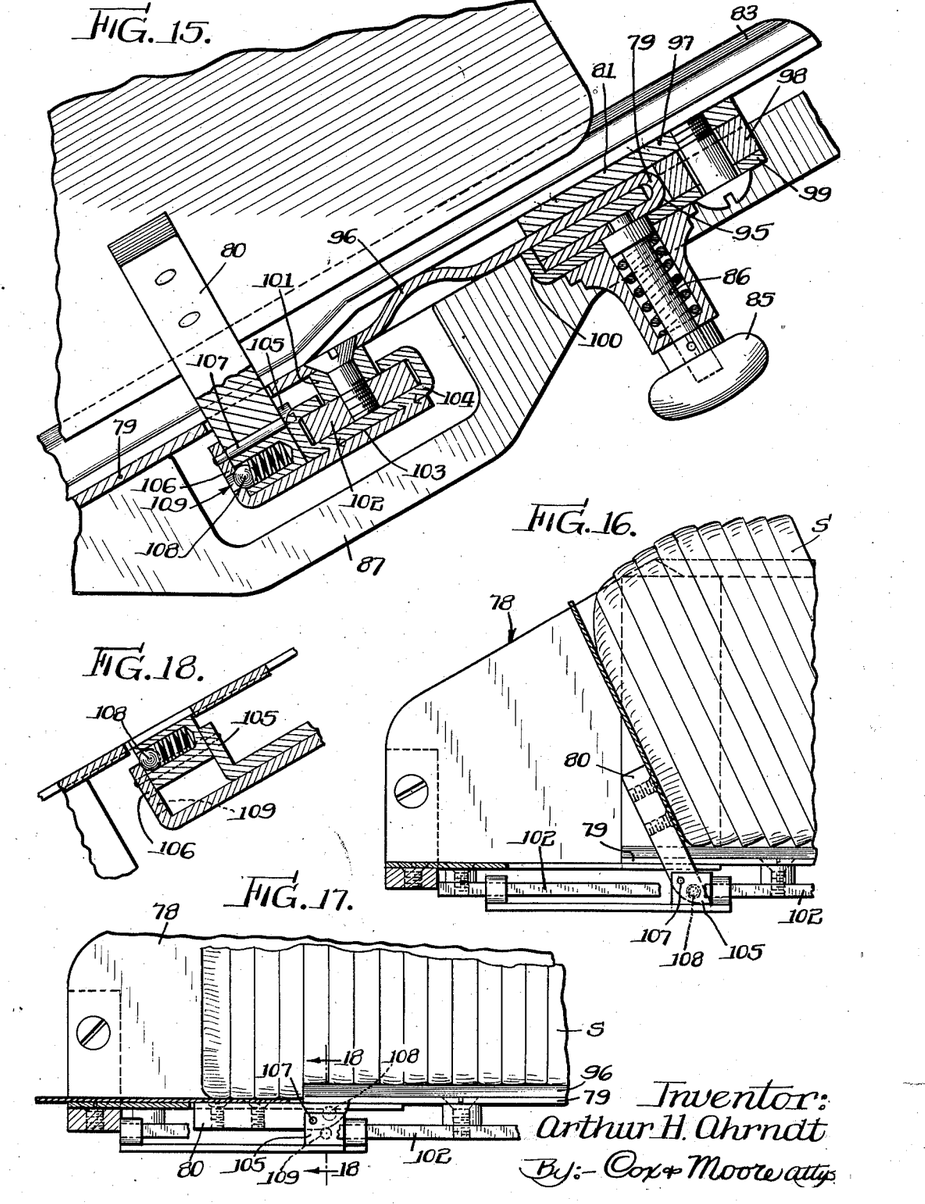
Fig. 15 is a detail sectional view on the line 15—15 of Fig. 10.
Fig. 16 is a transverse sectional view on the line 16—16 of Fig. 14.
Fig. 17 is a detail view similar to Fig. 16 but showing some of the parts in changed position.
Fig. 18 is a detail sectional view on the line 18—18 of Fig. 17.

The receiving trough plate 79, Fig. 15, is fastened to the bracket 87 and is beaded over as shown at 93, Fig. 14, the beads stopping at the vertical casting line 94, Fig. 10. At the edge of the trough opposite to the bead 93, the trough is beaded over as indicated at 95, Fig. 15. The trough 79 shows bulges 96, Fig. 15, which facilitate the sliding of the slices and the stiffening of the trough. The slide bearing 81 has a long connecting strip 97 to which the angle flange 82 is fastened. A spacer 98 is placed between the connecting strip 97 and a lower guide strip 99. This guide strip 99 is bent upwardly as shown at 100, Fig. 15, the top edge abutting the lower side of the bulged trough. The lower member 95 of the bent under trough 79 runs to the left and until it meets the upright 100. This guide combination 97—100 forms an effective guide on the bent under part of the trough 95.

Another guide underneath the slice trough guides the slice abutment 80. A filler piece 101 is fastened to the underside of the top plate and has attached thereto a wider guide rail 102. A bracket 103, Fig. 15, is fastened to the slide 104 and surrounds the guide rail 102. The members 103 and 104 are provided with uprights 105 and 106 which form a bearing for the pin 107 on which the abutment 80 pivots. A spring pressed ball 108 is located in the lower part of the abutment 80 and registers with a recess or hole 109 in the member 106, Fig. 15. This ball and hole connection serves as a stop to hold the abutment 80 in a slanting position, as shown in Fig. 16. The arrangement of the trough is such that it is pivotally mounted to a rigid part of the machine and adjusted with respect thereto. This trough can be readily removed and replaced when its use is not required. The slices as they are cut from the substance are arranged in stacked relationship on the trough, and when a complete loaf is sliced the operation of the handle or knob 85 will move the flange 82 and cause the entire loaf to be moved to the end of the trough. The manual operation of the knob 85 will cause the sliced loaf to force the pivoted member 80 down into the position shown in Fig. 17, at which time the slices may be easily slid along the trough and into the receiving bag or casing.

Guards 120 and 121, Figs. 1 and 14, are arranged on opposite sides of the knife. The feeding side guard 120 is stationary and the sliced loaf side guard 121 is free to be slid toward the left when the knife sharpener handle 28 has to be revolved.

When the sharpener crank handle 28 is turned to revolve the knife for sharpening purposes, the handle would normally interfere with the guard; therefore, the guard is so constructed that it can be slid to the left hand side, as shown in Fig. 10, to leave a gap between the knife housing and the guard for free turning of the crank. This guard is composed of two U-shaped frames 122 and 123 with interposed round rods 124. A vertical strip 125 is fastened to each U-shaped guard frame. This strip has a clamping screw 126 at its bottom and is guided between a long bar 127 which is fastened to two round spacers to the side of the trough, and the trough. The clamping screw on each vertical strip clamps the guard in either operative or inoperative position. The guard 120 on the feeding side of the machine is preferably made in the form of a casting.

Operation

During operation of the device the knife is caused to rotate on its axis or shaft 25 because of the operation of the crank housing 13 which, through the medium of the sprocket 19 and the chain 27, causes rotation of the knife sprocket 26. The rotation of the shaft 10, driven by the motor 2, causes rotation of the crank 13. The knife is thus rotated on its pivot and operates in an arc or circle. The rotation of the shaft 10 also causes operation of the eccentric crank arm 38 which causes rotation of the driving screw 52. The feed bracket is moved toward feeding engagement because of the nut wheel 61 engaging the spaces between the threads on the feed screw 52. A loaf of bread or other substance is operated so that the prongs 67 will engage the end of the loaf, as shown in Fig. 10. After the loaf has been fed to the position shown in Fig. 11, the prongs 67 will be retracted from the loaf and the feeding bracket, including the prongs 67, will return to inactive or retracted position as shown in Fig. 12. As the slices are cut they will fall on the trough as shown in Fig. 10. After the last slice has been cut and the end crust moved into the trough, the operator releases the handle 85, Fig. 10, and pulls the same toward the left, Fig. 10, thereby pulling all the slices in stack formation toward the end of the trough and into the wrapper or bag into which the sliced loaf is to be placed. The thickness of the slices is determined by the feeding position of the eccentric 32, which is adjusted by the index wheel 42. The wheel is operated by releasing the hand wheel 45, Fig. 3. The index wheel 42 is provided with several series of numbers which may be brought into registering position with the registering arrow 48, Fig. 1. Therefore, regardless of the position of the slot 46 with respect to the pin 57, Fig. 5, there will always be indicating numerals in plain view to let the operator see at a glance the slice which is being cut or to permit him to set the device to cut slices of the desired thickness.

The invention provides a machine which quickly and evenly slices bread, which causes the bread to be fed properly to the knife and in proper sequence with the circular movement thereof. The feeding mechanism moves the substance step by step to cutting position and automatically retracts itself at the end of the cutting operation so as to remove the holding or gripping prongs from the cutting plane of the knife and prevent the same from becoming fouled by the knife. The machine is capable of being adjusted to determine the thickness of slices to be cut, while the position of the feeding trough and the receiving trough causes the substance to be held in proper position at all times. Both the feeding trough and the receiving trough have their bases inclined as indicated, so as to insure proper cutting and placing. The machine is relatively simple and durable in construction, is efficient in operation and is not likely to get out of order.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. A slicing machine comprising a driven shaft, a stationary shaft, a knife bracket fixed to said driven shaft and revolvably supported on said stationary shaft, a knife mounted on said bracket and movable therewith, means for rotating the knife, an eccentric mounted on the driven shaft, feeding mechanism including a feed screw intermittently rotated by said eccentric, and pivoted means including a roller engageable between the threads of the feed screw, said roller being mounted on a lever, said lever being pivotally mounted on said feeding mechanism for selective engagement with the said feed screw and being translated thereby for advancing said feeding mechanism.

2. A slicing machine comprising driving mechanism, an eccentric driven by said driving mechanism, an eccentric rod driven by the eccentric, a feed screw, and free wheeling mechanism driven by said eccentric rod and positioned between the rod and the feed screw for driving the feed screw intermittently in one direction, a feed bracket, spaced from said screw, and pivotally mounted slide means having a roller operatively connected to the feed bracket, said roller being mounted on a lever pivoted on the feed bracket for selective engagement with the feed screw for translating the feed bracket.

3. A feeding mechanism for a slicing machine having a knife, comprising a feed trough, a feed bracket in the trough, prongs on said bracket and adapted to engage the rear end of a piece of substance, means for moving the bracket transversely to the plane of the knife toward feeding position, means for limiting the travel of the bracket toward the knife, spring means for retracting the prongs from the substance after they are loosened and normally urging the prongs to retracted position, latch means operatively associated with the bracket for locking the prongs in the substance and abutment means mounted on said trough and arranged in the normal path of said latch to release the latch at the end of said path, and additional means associated with the said abutment to positively loosen the prongs.

4. A slicing machine comprising a rotatably mounted knife, a driven shaft operatively connected to the knife for rotating said knife, an eccentric mounted on the driven shaft, feeding mechanism comprising a screw intermittently rotated by said eccentric, means for adjusting the eccentricity of said eccentric with respect to said shaft, said last named means comprising a radially extending member rigidly mounted on said shaft adjacent said eccentric, a radially extending guideway and a guide slidably operable in said guideway connecting said eccentric and said radially extending member whereby the eccentric is continually driven from said last named member, a revolvably mounted member on the shaft with portions thereof arranged in position to be manually rotatably actuated by the operator and having means engaging a slot in the eccentric, said revolvable means being adapted upon rotation to move said engaging means with relation to the slot to control the position of the eccentric.

5. A slicing machine comprising a driven mechanism and a knife driven by said driving mechanism, a feed bracket positioned in the trough for movement transversely to the plane of the knife, means on the feed bracket and engaging the feed screw for advancing the bracket to feeding position along the feed trough, said feeding bracket having gripping teeth pivoted thereto, stop means operatively associated with the trough for limiting the advancing movement of the feed bracket, resilient means operatively associated with said teeth and normally acting to instantly shift the teeth to inoperative position, locking means operatively associated with the resilient means to hold the teeth in operative position, said locking means being releasable by said stop means to permit instantaneous shifting of the teeth by said resilient means.

6. A slicing machine comprising a feeding trough, a slidable bracket positioned in the trough, an intermittently rotating feed screw spaced from said bracket, an arm pivoted to said bracket, a wheel mounted adjacent the end of said arm and being spaced from the pivot a distance substantially equivalent to the distance between said pivot and said feed screw, spring means for urging the arm in a predetermined direction against the screw, said wheel adapted to engage the feed screw between the threads thereof to translate the bracket along the feeding trough, and handle means on said arm at a point spaced from said pivot for rotating the arm about the pivot to retract the wheel from the screw.

7. A slicing machine comprising a rotatably mounted knife, a driven shaft operatively connected to the knife for rotating said knife, an eccentric mounted on the driven shaft, feeding mechanism comprising a screw intermittently rotated by said eccentric, means for adjusting the eccentricity of said eccentric with respect to said shaft, said last named means comprising a radially extending member rigidly mounted on said shaft adjacent said eccentric, a radially extending guideway and a guide slidably operable in said guideway connecting said eccentric and said radially extending member whereby the eccentric is continually driven from said last named member, a revolvably mounted member on the shaft with portions thereof arranged in position to be manually rotatably actuated by the operator, interengaging means between said eccentric and said revolvably mounted member and adapted to adjust the eccentric radially with respect to the shaft when the revolvably mounted member is rotated relatively to said shaft whereby to adjust the eccentricity of said eccentric, and means to selectively lock the said revolvably mounted member to the shaft to retain the said adjustment.

8. A slicing machine comprising a driven shaft, a stationary shaft, a knife bracket fixed to said driven shaft and revolvably supported on said stationary shaft, a knife mounted on said bracket and movable therewith, means for rotating the knife, an eccentric mounted on the driven shaft, feeding mechanism including a feed screw intermittently rotated by said eccentric, said feed screw having threads, a roller adapted for engagement with the feed screw between the threads, and means carrying said roller for translating the said feeding mechanism when the roller is in engagement with the feed screw, said carrying means being a lever mounted on said feeding mechanism and operable in a direction substantially at right angles to the axis of the feed screw to selectively engage or disengage the roller with the screw.

9. A slicing machine comprising a driven shaft, a stationary shaft, a knife bracket fixed to said driven shaft, and revolvably supported on said stationary shaft, a knife mounted on said bracket and movable therewith, means for rotating the knife, an eccentric mounted on the driven shaft, feeding mechanism comprising a feed screw intermittently rotated by said eccentric, means for adjusting the eccentricity of said eccentric with respect to said shaft, a slide feed member, and pivoted roller means adapted for engagement with the screw for causing translation of the slide feed member, said roller means being mounted upon a bar pivoted to the slide feed member and operable in a direction substantially at right angles to the axis of the feed screw to selectively engage or disengage the screw.

ARTHUR H. AHRNDT.